US01204189782

(12) United States Patent
Agrawal et al.

(10) Patent No.: US 12,041,897 B2
(45) Date of Patent: Jul. 23, 2024

(54) PHOTOVOLTAIC STRUCTURES FOR USE IN AGRICULTURE FARMS

(71) Applicant: Purdue Research Foundation, West Lafayette, IN (US)

(72) Inventors: Rakesh Agrawal, West Lafayette, IN (US); Muhammad Alam, West Lafayette, IN (US); Mitchell Tuinstra, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/474,003

(22) Filed: Sep. 13, 2021

(65) Prior Publication Data
US 2022/0151163 A1    May 19, 2022

Related U.S. Application Data

(60) Provisional application No. 63/113,537, filed on Nov. 13, 2020.

(51) Int. Cl.
  *A01G 9/24* (2006.01)
  *H02S 20/10* (2014.01)
(52) U.S. Cl.
  CPC .............. *A01G 9/243* (2013.01); *H02S 20/10* (2014.12)
(58) Field of Classification Search
  CPC ................................. A01G 9/243; H02S 20/10
  See application file for complete search history.

(56) References Cited

U.S. PATENT DOCUMENTS

| 2015/0214885 | A1* | 7/2015 | Wu ........................ | H02S 20/32 136/246 |
| 2017/0336105 | A1* | 11/2017 | Au ........................... | F24S 25/10 |
| 2019/0190440 | A1* | 6/2019 | Kingsley ................. | F24S 25/13 |
| 2019/0312543 | A1* | 10/2019 | Sgarrella ................. | F24S 25/65 |

* cited by examiner

*Primary Examiner* — Jayne L Mershon
(74) *Attorney, Agent, or Firm* — C. John Brannon; Brannon Sowers & Cracraft PC

(57) ABSTRACT

A method and apparatus for generating solar power in agricultural fields while minimally impacting crop growth and farming efforts, including positioning an elongated solar panel above crops, wherein the elongated solar panel runs generally parallel to longitudinal lines and wherein the elongated solar panel has at least one solar transducing face and an endless edge surrounding and perpendicular to the at least one solar transducing face, automatically pivoting the elongated solar panel such that the at least one solar transducing face is oriented parallel to incident solar rays during predetermined times when plant growth requires incident sunlight, automatically pivoting the elongated solar panel such that the at least one solar transducing face is oriented parallel to the vertical during rain, automatically pivoting the elongated solar panel out of the way of heavy farm equipment, and automatically pivoting the elongated solar panel such that the at least one solar transducing face is oriented perpendicular to incident solar rays at predetermined times when plant growth does not require direct sunlight. The elongated solar panel is positioned sufficiently above crops to give clearance to heavy farm equipment passing therebelow and/or adjacent panels are spaced sufficiently apart such that heavy farm equipment may pass therebetween.

8 Claims, 9 Drawing Sheets

PHOTOVOLTAIC STRUCTURES FOR USE IN AGRICULTURE FARMS

CROSS-REFERENCE TO RELATED APPLICATIONS

This patent application is a continuation-in part of co-ending U.S. patent application Ser. No. 16/997,386, filed on Aug. 19, 2020, incorporated herein by reference, and also claims priority to U.S. provisional patent application Ser. No. 63/113,537 filed on Nov. 13, 2020.

GOVERNMENT FUNDING

This invention was made with government support under DGE 1735282 and CBET-1855882, awarded by the National Science Foundation. The government has certain rights in the invention.

TECHNICAL FIELD

The present disclosure relates to the off-axis orientation of vertical photovoltaic modules on farmland to minimize the reduction in radiation on the ground due to shadowing. The goal is to minimize and preferably eliminate any negative impact due to the shadow on plant growth and crop yield. This invention enables cogeneration of food and energy from a farmland.

BACKGROUND

This section introduces aspects that may help facilitate a better understanding of the disclosure. Accordingly, these statements are to be read in this light and are not to be understood as admissions about what is or is not prior art.

Within the next two to three generations, our world is expected to grow from seven to more than ten billion people for a 'full earth'. This increase in population, coupled with rising per capita income and consumption habits, will create unprecedented stress on food, energy, and water (FEW) demand and supply. A daunting question before us is: how can humans sustainably meet their current as well as full earth FEW needs with renewable resources?

Solar radiation is the only energy resource that is both locally available and sustainable, and it is the only resource with potential to meet the entire FEW needs for the full earth at any time in the future. However, even to meet current demand levels in most population centers around the globe, the nature of solar radiation leads to critical competition for land between food and energy.

To address this competition, systems achieving co-production of energy and food generation on the same land have been proposed. These so-called agrivoltaic or photovoltaic (PV) aglectric systems combine agricultural production and solar energy production on the same land area. Most current practices devote a subsection of land area to agricultural production and another subsection to energy production, which includes systems proposing inter-layering of energy systems and agriculture. The theoretical advantage of PV aglectric systems is the vertical development of land, which improves overall land productivity.

To quantitatively describe this increase in land productivity, the metrics "Land Use Efficiency" and "Land Equivalent Ratio" (LER) have been recently adopted. Land Equivalent Ratio is used to assess the productivity of mixed systems, such as intercropping, compared to single crop systems, and is defined for the PV aglectric system as:

$$LER = \frac{Y_{crop,aglectric}}{Y_{crop,ag}} + \frac{Y_{electricity,aglectric}}{Y_{electricity,PV}}$$

where:
$Y_{crop, aglectric}$=Crop yield in PV aglectric system
$Y_{crop, Ag}$=Crop yield in agriculture only system
$Y_{electricity, aglectric}$=Electricity yield in PV aglectric system
$Y_{electricity, PV}$=Electricity yield in photovoltaic only system In the past decade, some previously theorized PV aglectric systems have been implemented in Europe using the LER metric to determine success. In France, a south-facing PV aglectric system with full (1.6 m row width) and half density (3.2 m row width) panels (0.8 m wide) was developed, which caused spatially varying transmitted radiation on the crops. This system was later paired with tracking PV aglectric systems, one of which used a simple anti-solar-tracking (dubbed "controlled tracking") algorithm to minimize midday radiation loss; these systems caused a homogenous spatial distribution of transmitted radiation on crops. The loss in radiation caused a statistically significant biomass loss of lettuce in spring and summer months, suggesting that care must be taken in tracking systems to minimize intercepted radiation in a way that does not impede crop growth. In Germany, it was demonstrated that an 18-19% loss in wheat, potato, and celeriac yield was due to radiation loss using a fixed-tilt south-facing PV aglectric system with an LER of 160%. It was also demonstrated that shading provided by PV panels during hot months could increase crop yield for potatoes, giving their system an overall LER of 186%. This suggests that controlled shading using tracking algorithms and optimized PV orientation angles such as those suggested hereinbelow are necessary for optimizing crop yield.

However, LER does not capture the full picture. In countries, states, and regions that are land-constrained in their ability to self-sufficiently produce electricity and food for their populace using primarily land-intensive renewable electricity generation strategies such as solar, wind, or biomass, the LER metric is misleading. LER assumes that the additional land for PV installation can be converted for agriculture production. Then it calculates a composite food production from the existing agricultural land with added PV and with this additional land producing food. However, generally such additional land is either unavailable for PV installation or the additional land is unsuitable for food production. For the UK and other densely populated regions, it is found that this is the case. Thus, the only parameter of interest is to reduce any negative impact on crop yield due to the use of PV panels on the agricultural land. Regions that are land-constrained must implement co-production strategies to support a sustainable food and energy nexus.

Major agricultural crops in the U.S. undergo one of two major photosynthesis types: C3 or C4. As distinct metabolic pathways, they experience different utilization of resources such as water, CO2, and photosynthetically active radiation (PAR). In the case of C3 plants, the photosynthetic rate generally saturates at lower levels of irradiance than for C4 crops, and this level is often below the midday irradiance for many agricultural regions. This trait suggests that redirecting the irradiance of crops for electricity production may not affect crop yield for C3 plants.

However, there are multiple other requirements for maintaining crop yield besides net radiation incident on the farmland. For field crops, homogeneity of irradiance reductions is crucial for most farming practices. Additionally, the duration of direct shadows during periods of low irradiance (near sunrise and sunset) may push plants into low photosynthetic rate regimes, or possibly into respiratory regimes, which can negatively impact plants. Therefore, PV aglectric systems that manipulate PV orientation in ways that allow a range of shadowing scenarios may increase overall crop yield.

For all food and electricity co-production systems, agriculture can only use transmitted radiation not first absorbed by the panels. This creates an inherent trade-off. One consideration to designing PV aglectric systems, therefore, is to manipulate and maximize the solar irradiance incident on the ground for a given solar electricity output.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting. Further, in this disclosure, the figures shown for illustrative purposes are not to scale and those skilled in the art can readily recognize the relative dimensions of the different segments of the figures depending on how the principles of the disclosure are used in practical applications.

DETAILED DESCRIPTION

Figure 1:
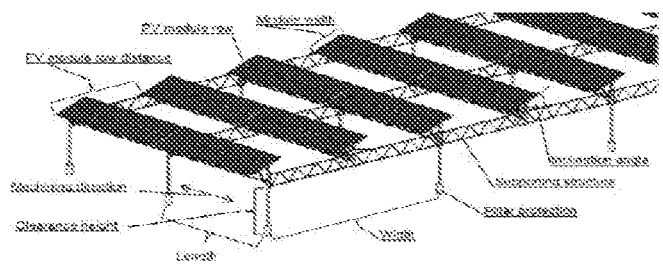
FIG. 1 is a first perspective view of a prior art solar array.

For the purposes of promoting an understanding of the principles of the disclosure, reference will now be made to the embodiments illustrated in the figures and specific language will be used to describe the same. It will nevertheless be understood that no limitation of the scope of the disclosure is thereby intended, such alterations and further modifications in the principles of the disclosure, and such further applications of the principles of the disclosure as illustrated therein being contemplated as would normally occur to one skilled in the art to which the disclosure relates.

The rising deployment of photovoltaic (PV) technology as a primary energy source coupled with the increasing demand for food due to population increase necessitates the use of agricultural land for electricity—herein referred to as PV-aglectric farming (PVA)—in the US and globally. Unlike the regular PV installations designed for solely power generation, PVA farms require several additional considerations. The choice of crop or crops being cultivated in conjunction with the choice of PV modules, their installation, and daily operation strategies during the cultivation period make an important impact on both power and crop yield.

From the reported PVA farming research literature, the cultivated crops include a long list of vegetables including cucumber, lettuce, bean, celeriac, potatoes, pepper, broccoli, cauliflower, eggplant, yam, taro, peanut, pumpkin and even winter wheat. Some of the major crops such as corn, soybean, and the like, are missing from large scale PVA farming. This primarily stems from the constraints imposed by (1) the farm scale equipment used to grow and harvest a crop on a typical large-scale farm and (2) the nature of shadow cast by the PV structures. An important parameter for PVA farming is the interrelationship between the crop being cultivated and the choice of PV modules, their installation architecture, and mode of operation. The reason being that during daytime, PV panels cast a shadow on the ground and deprive plants of photosynthetically active radiation (PAR) consisting of photons in the 400-700 nm range. Nearly all of the reported studies have used fixed South or South-west (SW) facing monofacial PV panels. These panels cast continuous shadow on the plants underneath and are only suitable for shade tolerant crops such as lettuce, peppers, spinach, and the like. Furthermore, in the nighttime, the solar panels extending on top of the plants, reduce sky view of the plants and minimize longwave radiation loss at night. This results in nighttime temperature of the soils and plants underneath the solar panels to be elevated. For crops grown in the summer months, this can be detrimental to the crop yield as it increases the respiration rate for the plants in the nighttime. Another detrimental impact of the use of solar panels is manifested during periods of rain. The rainwater runs across the edges of the panels and falls on the ground underneath. This leads to heterogeneity in the water distribution below. Depending on the wind direction and the rain fall, the plant rows that are directly underneath the solar panels could be deprived of direct rainwater and in return the land directly underneath the solar panel edges could get heavy water fall, causing damage to the plants in that area. The heavy water fall from the PV modules can lead to soil erosion and the formation of gullies adjacent to the plant rows.

Only one setup has recently reported east-west (E-W) tracking monofacial PV panels to grow lettuces. The advantage of a tracking system is that they cast a dynamic shadow that moves throughout the day and the shadow can be manipulated. Thus, tracking panels can provide a means to control shadow during critical periods of plant growth to reduce the impact on crop yield. Recently, for crops that must have high PAR intensity during the growing season, it has been suggested to use the Purdue PV panel designs as described in parent patent application Ser. No. 16/997,386 to automatically pivot the PV module about at least one respective axis to minimize shadows cast on active farmland.

Figure 2:
FIG. 2 is a second perspective view of the solar array of FIG. 1.
Figure 3:
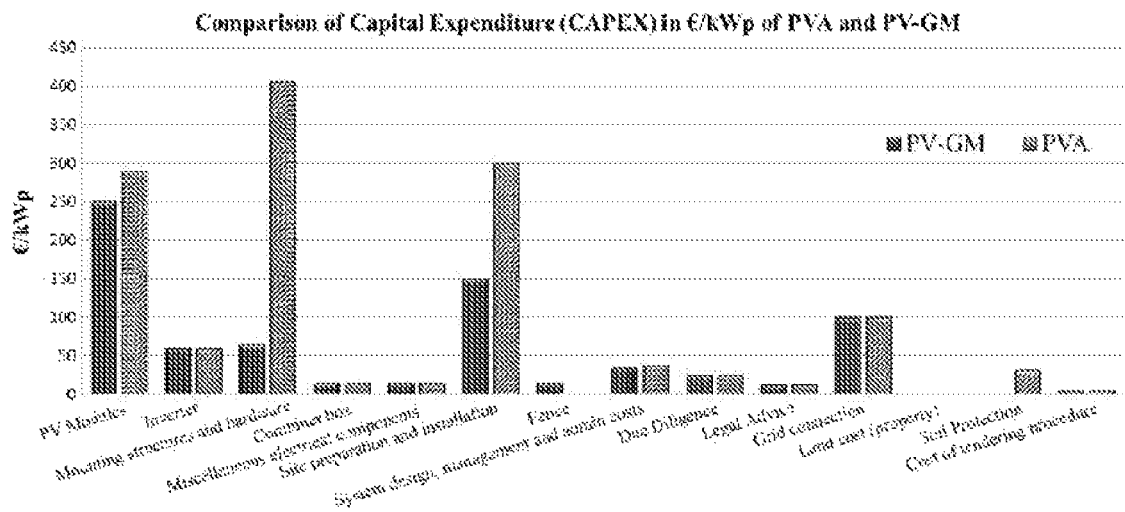
FIG. 3 graphically compares capital expenditure for the prior art PVA system and the conventional PV system.

Despite the remarkable potential of PVA farms to co-produce food and energy, the high cost of implementation has prevented its widespread deployment. While most demonstration testbeds are raised 2-4 m above the ground for ease of construction and maintenance, it is generally understood that these traditional structures are unsuited for application where modern day large size farm machineries are employed for cultivation and harvesting. The height and width of combine-harvesters requires that solar panels be high enough and the distance between the two adjacent solar rows be wide enough to allow unimpeded movement of them. There are currently two known systems that allow such unimpeded movement of farm machinery for large scale farms. In one prior art installation shown in FIGS. 1 and 2, the overall height of the installation reaches 7.8 m and PV modules are elevated with a clearance height of 5 m to allow unimpeded movement of the combine-harvester beneath. As seen from this design, the cross bar used between the adjacent solar rows restricts the vertical clearance and further elevates the PV array leading to an increase in overall structural cost. The system shown in FIGS. 1 and 2 uses fixed south-west facing PV arrays. Since the PV modules are fixed, they cast a continuous shadow on the ground underneath and this shaded area experiences reduced sunlight intensity throughout or majority of the day when sun is in the sky. We call such shadow a 'static' shadow. A static shadow may move a little bit during the day but such movements are small compared to the dynamic shadow that we describe below.

Figure 4:
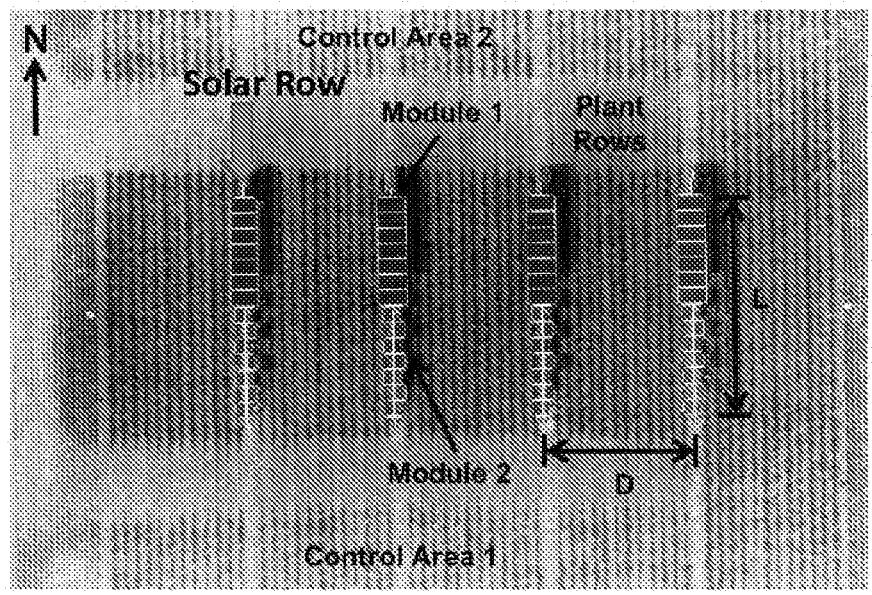
FIG. 4 is a perspective view of a solar array of a second embodiment of the present novel technology.

As shown in FIG. 4, solar rows are 30 ft (9.11 m) (D) apart with each pole height of 18 ft (5.4 m) (H) above the ground level to accommodate a combine-harvester. The length L of each solar row is 46 ft (13.97 m) with distance between poles of 16 ft (4.86 m). This solar row spacing, D, was decided to accommodate the width of a combine-harvester on a typical Midwest US farm. There are two noteworthy aspects that are different from the prior art shown in FIGS. 1 and 2. First, the Purdue system uses East-West (E-W) tracking solar arrays. That means a shadow underneath is constantly moving with the sun's position throughout the day. Any given land area is under shadow for only a small duration of the daytime. We call it dynamic 'shadow'. In a dynamic shadow, any plant underneath is deprived of sunlight for only the duration while the moving shadow is cast upon it. This is advantageous for the crops as they get direct sunlight majority of the day time. Another advantage of the tracking system is that the tracking of the PV panels can be manipulated during the day to adjust time period for which sunlight falls on them and hence the shadow on the ground. The second difference between the Purdue and the prior art systems is that the Purdue system does not use a cross bar between the solar rows.

One big disadvantage of elevated PV arrays to allow unimpeded movement of farm machinery is that the structure must be robust to withstand high local wind speeds. For example, the Purdue system was designed to withstand guaranteed wind speeds up to 80 miles (126 km) per hour (mph) and most likely up to 100 mph (160 kmh). This meant that the poles extend 25 ft (7.59 m) underground. Similarly, the prior art system is also designed for high local winds. All this robust design coupled with the elevated height, adds exorbitantly high cost to the PV structure and makes the electricity cost high when compared to the conventional ground mounted south facing PV structures (PV-GM). A technoeconomic analysis was made of the prior art PVA farm consisting of fixed tilt SW facing bifacial PV panels (FIGS. 1 and 2) versus a conventional ground mounted monofacial PV-GM facility to compare the performance between the two. The installed PVA capacity was 519.2 $kW_p$/ha and that of PV-GM 689.7 $kW_p$/ha. Both the capital expenditure (CAPEX) and annual operating expenditures (OPEX) for both the facilities were compared. The levelized cost of electricity (LCOE) for PVA is €0.0829 $kWh^{-1}$ and is 38% higher than the corresponding LCOE value of € (euro) 0.0603 $kWh^{-1}$ for PV-GM. It was found that the OPEX for the PVA was lower than the OPEX for PV-GM mainly due to the reduced annual land cost and maintenance/mowing costs. However, the CAPEX of the PVA was 73% higher than the CAPEX for the PV-GM. Almost the entire increase in PVA CAPEX is due to two factors: PV panel mounting structure and associated hardware, and site preparation and installation. The height of poles approaching 20 ft and higher from the ground level to provide clearance for the combine-harvester is mainly responsible for both the factors. Not only more metal is needed due to increased height of the supporting poles, but design for the structure to be sturdy under extreme wind load anticipated under the lifetime of PVA (94 miles $h^{-1}$ for prior art PVA) adds to the cost. This requires expensive foundation for the poles (for example in case of Purdue structure, each pole extends 25 ft under the soil) and the cross bars as used by the prior art design. In addition, such a sturdy construction requires heavy machinery such as tall cranes which requires soil protection panels and special handling to avoid compaction of the soil and adds to site preparation and installation costs. For the widespread use of PVA on large-scale farms, it is essential to decrease cost through innovations to reduce the height of the PV panels while still providing clearance for the unimpeded movement of a tall combine-harvester.

As illustrated in FIGS. 4-8, the present invention provides the low-cost PV structure designs that reduce the height at which PV panels need to be installed while allowing unimpeded machinery movement on a farm. Another feature of these designs is that they cast dynamic shadows and minimize detrimental impact of shadows as compared to the cases that cast static shadows. There are two embodiments of the instant novel technology that are described below. In our description, we have used terms 'PV panel' and 'PV module' interchangeably. Each refer to the PV module that converts the incident sun light to electricity.

One embodiment relates to an East-West (E-W) tracking PV system similar to the one shown in the prior art, but with an added feature, namely during the operation of the farm machinery on the agriculture field the PV panels are brought into a position to avoid any obstacle to the machinery movement. Under normal tracking of the sun, the PV panels do extend in the region between the solar rows and would impede motion of the farm machinery such as a combine-harvester. However, during the machinery movement on the farm, they are rotated at such an angle that they are close to the vertical position and do not present obstruction to the farm machinery.

Figure 5:
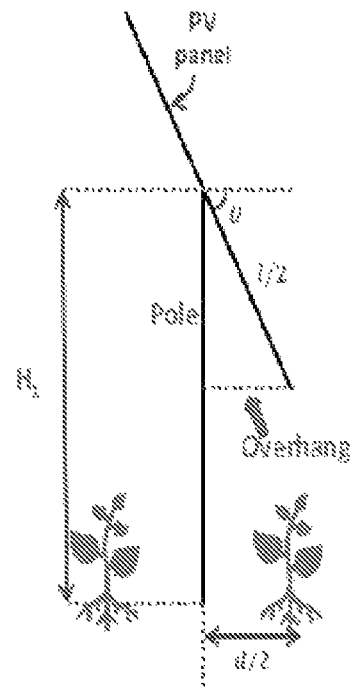
FIG. 5 graphically illustrates minimum permissible PV panel inclination during movement of combine-harvester machinery.

FIG. 5 shows a side view of a solar row. The axis of rotation of the solar array is perpendicular to the plane of the paper. PV panels track sun in E-W mode. The height $H_1$ in this figure is the total height of the axis of the tracker from the ground level and is equal to the pole height and any extra height used for the installation of the tracker. For example, this value for the Purdue University's PVA tracker is 20 ft (18 ft pole height+2 ft tracker height). As the PV panels track the sun in the sky, the angle θ from a horizontal axis changes its value from being $\theta_m$ in the morning (facing east) to reaching zero near the noon time and eventually moving in the opposite direction to face the setting sun at $180°+2\theta_m$. At both the extreme E and W positions, due to angle $\theta_m$, we have overhang of the PV panels that blocks the space between the two adjacent solar rows. This reduces the effective width of the space available for the combine-harvester movement between the two adjacent rows of the PV panels and necessitates the installation at an elevated height. Furthermore, the overhang has an impact on the plants being grown directly underneath them and the distribution of rainwater upon them. The prior art East-West (E-W) tracking PV systems are designed such that their tracking angles are limited. The currently used $\theta_m$ values are in the range of 45° to 60°, and for Purdue's installation this value is 45°. Each of the 72-cell 300 W polysilicon modules used in this installation have dimensions of 70"×39.1×1.2". The width (39.1) runs along the axis of the tracker, therefore, the dimension $\ell$ is 70". The overhang when the module is at $\theta_m$ is $(\ell/2)\cos\theta_m$. Which means that for the Purdue's case with $\theta_m$ of 45°, the overhang is 24.75". This nearly two feet of distance reduces the effective width between the two adjacent solar rows for combine-harvester movement. The height of the widest farm equipment underneath this overhang has to be less than the height of the edge of the solar panel. Furthermore, in the prior art arrangement, the distance between the two adjacent solar rows is 30 ft and there are 12 plant rows planted 30" apart from each other. It means that d/2 is 15" (in this case, d is the distance between the adjacent plant rows) and the distance between the closest plant row and the solar row is also 15". Clearly the overhang of 24.75" influences the photosynthesis activity of the plant row underneath it. This means that two plant rows out of 12 plants rows between the two adjacent solar rows are impacted. In the night time solar panels obstruct the sky view for these two impacted plant rows thereby impacting their night time temperature and respiration rate. Similarly, during rain fall, the waterfall on these plants will be impacted, especially if the height of the solar installation were to be reduced and the PV panels were to be brought closer in height to the plants. If the $\theta_m$ was at the highest available value of 60°, the overhang value will still be substantial at 17.5" to not only cover the plant row on each side of the pole but also PV panel's height will have to be higher than the height of the widest farm machinery in the region underneath the overhang.

Typically, the allowed angle $\theta_m$ is greater than $\cos^{-1}(d/\ell)$, where d/2 is the distance from the pole to the nearest plant row. Alternatively, d/2 can be taken as the closest distance a combine-harvester (or any other farm machinery) has to approach the poles of a solar row. For example, in the prior art arrangement, the distance from the pole to the nearest plant row, d/2, is 15" (in this case, d is also the distance between the adjacent plant rows) and the value of $\theta_m$ should be greater than 64.6°. Generally, a combine-harvester will have to fully cover all the plant rows, so its width will exceed the width of the entire plant rows between the two adjacent solar rows. So if we take the closest distance of the combine-harvester from the pole to be half of 15", then the $\theta_m$ should be greater than 77.6°. Under this scenario, height of the solar panels will not be dictated by the height of the farm machinery and the installation height of the solar panel would be decoupled from the height of the farm machinery. Furthermore, in the night time, if the solar panels were to be brought at $\theta_m$, the sky view the plants adjacent to the solar rows will be increased. Similarly, during rain periods, the solar panels can be brought to $\theta_m$, to ensure that no plant is directly covered by the overhead solar panels and hence directly exposed to the rain. A higher value of $\theta_m$ than the one calculated here would be preferred as it will further reduce the overhang and take the PV module's edge closer to the pole allowing for more space for the farm machinery. Thus, a $\theta_m$ value closer to 90° will make the PV module close to the vertical position during the passage of the farm machinery and would be most preferred.

Of course, just because the trackers are designed for high $\theta_m$ according to the current invention, it does not necessitate that during the day period, they track the sun over the entire available range of $\theta$. They can track the sun in any interval of the available range of $\theta$. For example, they can start tacking the sun in the morning at an angle $\theta_1$ and end in the evening at $180°+\theta_1+\theta_2$, where both $\theta_1$ and $\theta_2$ could be equal to each other but each one is less than $\theta_m$. However, the panels should be able to get to the highest available $\theta_m$ during the passage of the farm machinery to allow its unimpeded passage. It is also preferred that they get to the highest available $\theta_m$ during the nighttime to increase the sky view of the plant rows adjacent to the solar rows. Similarly, during the periods of rain they can be brought to the highest available $\theta_m$ to expose these plant rows directly to the rainwater, and to avoid heavy water fall from the edges of the solar panels directly on the plants.

Another feature of the current invention is that the crossbar between the two adjacent solar rows for bracing as shown in the prior art design are not allowed. We do not want any structure between the two adjacent solar rows that will obstruct the free movement of the farm machinery and require elevation in height. Thus, the arrangement shown for the solar rows of the prior art PVA structure is preferred.

Figure 6A:
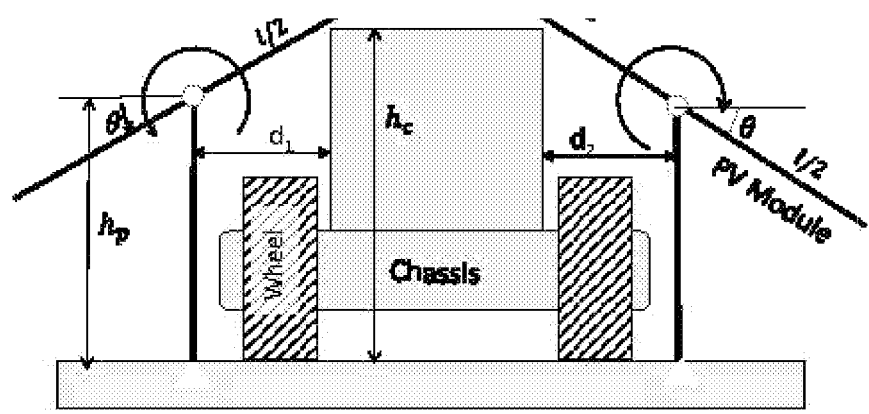
FIG. 6A graphically illustrates reduction of PV module height without impeding the functioning of traditional combine harvester.
Figure 6B:
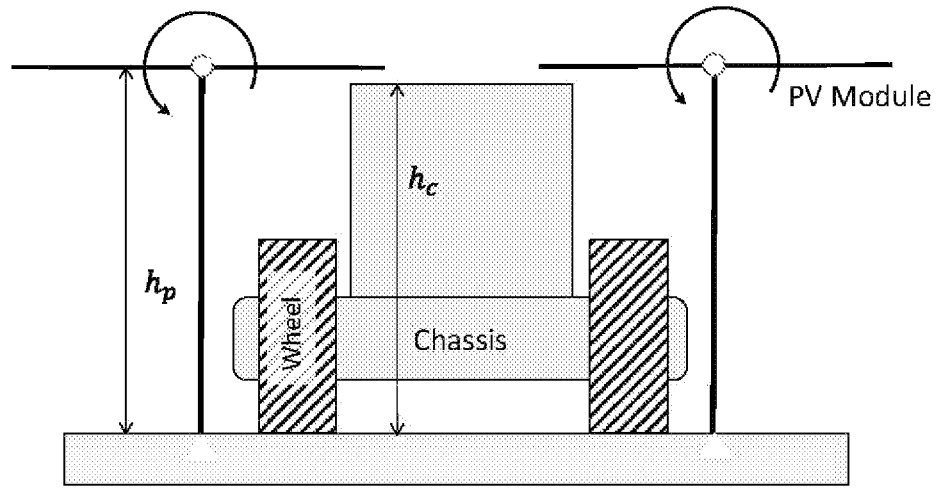
FIG. 6B graphically illustrates PV module height in a Prior Art system.
Figure 6C:
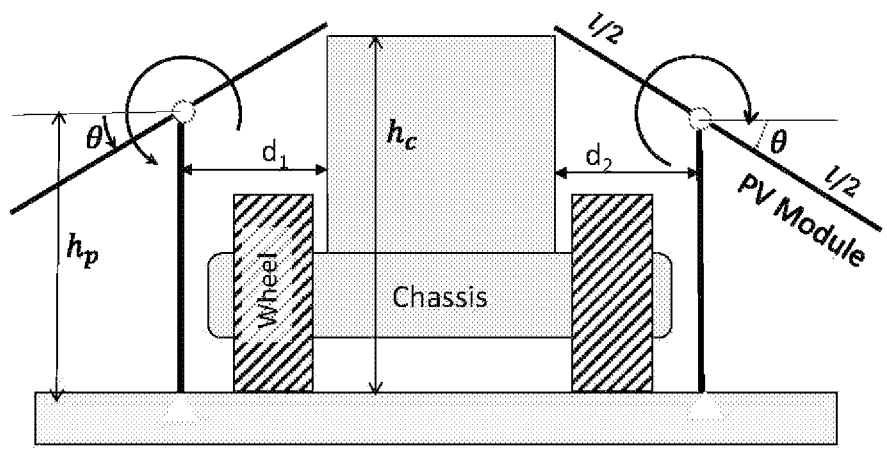
FIG. 6C graphically illustrates PV module height with the solar panels pivoted to narrowly avoid contact with the top of a traditional combine harvester.

Finally, an important aspect of the novel technology is the orientation adjustment of the PV panels between the two adjacent rows during the passage of the tall farm machinery between these two rows to allow for the maximum clearance between the solar panels and the farm machinery or provide minimum pole height for a given clearance. It is a common practice to move the solar panels in all rows in tandem to track the sun as its location in the sky changes during the day. All the panels in all the rows face east in the morning and track sun throughout the day to end facing west in the evening. During farm machinery use, the trackers of the two adjacent rows be moved in the opposite directions—one towards east and the other towards west such that edge of the solar panels between the two rows are at their highest positions as shown in FIG. 6A. In this figure, the right row PV tracker rotates clockwise such that the leftmost edge of the PV panels that are within the two adjacent rows are at their highest point. Similarly, the left row PV tracker rotates counterclockwise such that the rightmost edge of the PV panels that are within the two adjacent rows are at their highest point. Basically, for the solar row closer to the east, tracker will be rotated such that PV panels face east, and for the solar row closer to the west, tracker will be rotated such that PV panels face west.

The rotation system allows the modules to be rotated in opposition so that a traditional combine-harvester can operate unimpeded, see FIG. 6A. The minimum separation between and PV-rows is defined by the width of the harvester. Most important, the module height requirement is now significantly reduced. The scheme removes the intra-row support string or cross bar, therefore the module height is determined not by the height of the combine to pass underneath, but by the minimum distance between the maximally rotated module and the nearest top edge of the combine harvester. We note that this specialized module rotation is necessary only for relatively short time duration when the harvester passes through the rows. Once the harvester is gone, one can resume the standard tracking procedure.

Figure 6D:
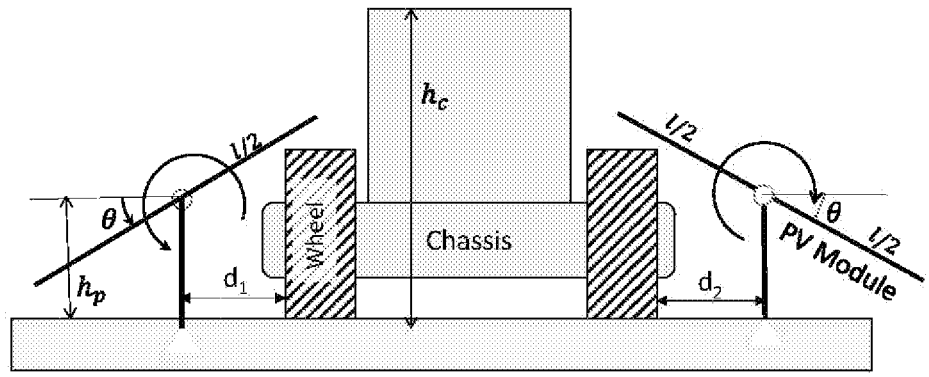
FIG. 6D graphically illustrates shortened PV module height with the solar panels pivoted to narrowly avoid contact with the tires of a traditional combine harvester.

The shortest distance between the pole and the farm machinery's tallest part on each of the two sides are shown as $d_1$ and $d_2$ in FIG. 6A. The two distances may be equal or quite different and the smaller of the two will determine the limiting pole height. For the sake of discussion, let $d_1$ be less than $d_2$. Then minimum height of the pole will be $h_p = h_c - d_1 \tan\theta$. This height is lower than the height needed in FIG. 6B which will be equal to the tallest height $h_c$. In the special case shown in FIG. 6C, where distance $d_1$ is such that the tallest part of the farm machine barely touches the end of the solar panel ($d_1 = \ell/2$ apse) and the pole height $h_p = h_c - \ell/2$ sine. It should be emphasized, that the tallest part of the farm machinery may not always dictate the clearance between the solar panel and the farm machinery. It is the tallest part of the farm machinery that is obstructed by the solar panel that matters. FIG. 6D shows that the height of the tires (diameter of tires) are close to the solar row and could be obstructed by the solar panel. In this case, the height $h_c$ will be replaced by the height of the tire and the minimum pole height will now be given by $h_p$=height of tire−$d_1 \tan\theta$. We see that the height of the poles will now be lower than the height of the tires. To demonstrate the efficacy of the instant novel technology, consider the case in FIG. 6C, where $h_c$=20 ft, maximum angle of rotation for the PV tracker with respect to the horizontal ($\theta_m$) is 60° and $\ell/2$ equal to 35". In this case, height of the pole will be 17.47 ft ($h_p = h_c - \ell/2$ sine), which is substantially lower than 20 ft. Similarly, consider another case where wheel height is six feet and we need three feet clearance above the wheel height. In this case the pole height will have to be at least 9 ft as seen from FIG. 6B with the needed clearance above the wheel tires. However, for the case in FIG. 6D with $d_1 = \ell/2 \cos\theta$, the horizontal ($\theta_m$) of 60° and $\ell/2$ equal to 35", this pole height will be only 6.47 ft. We note that our specialized module rotation, for a given clearance not only reduces the permissible height of the pole but for a given pole height maximizes the clearance when the harvester passes through the rows. Therefore, we recommend its preferred use for the time duration when the harvester passes through the rows.

Now we will demonstrate the benefit of the instant novel technology in relation to the corn plantation at the prior art PVA farm. First, we point out that there is a minimum height above which that the solar panels must be installed at a PVA farm. This height is determined by the height of the plants being grown on the agriculture farm. Under fully grown condition, during the daytime, the plants should not cast shadow on the panels as it will be detrimental to the performance of the solar panels. Thus, this height will be function of the crop being cultivated and for example, it will be greater for corn plants than for soybean plants. In case of the prior art PVA farm, for a maximum height of the corn plant of less than 8 ft, and allowing for at least one foot of clearance between the bottom edge of the PV panel and top of the corn plant during tracking, with $\ell/2$ equal to 35" for the 72-cell 300 W polysilicon module with dimension of 70"×39.1×1.2", the total height $H_1$ in FIG. 15 is equal to ~12 ft. This is substantially lower than the current corresponding height of 20 ft to 25 ft. It should be noted that corn is a relatively taller plant when compared to the other major crops such as soybean, wheat and rice as well as most vegetables. That means that for those crops, the height $H_1$ can be further reduced. We find that due to this invention, the height of the farm machinery no longer dictates the height of the PV solar installation. The height of the two is decoupled from each other. This allows to reduce the height and hence the capital cost associated with the PV structure and its installation. It is important to note that this reduction in height is achieved while retaining the high efficiency of power generation due to E-W tracking of the sun.

One note regarding the choice of PV modules. In the last decade, tremendous progress has been made in the development of the various type of PV modules including bifacial solar cells. The instant novel technology is not restricted to any one type of PV modules. For example, the invention can use either the monofacial or the bifacial modules. Both type of modules is suitable. In a monofacial module, sunlight is collected from only the front face that directly faces the sun. In a bifacial module, sunlight is collected from both front and back surfaces of the module, it collects both reflected direct and diffused sunlight from the back surface and can potentially provide more electricity than the corresponding monofacial solar module.

Figure 7:
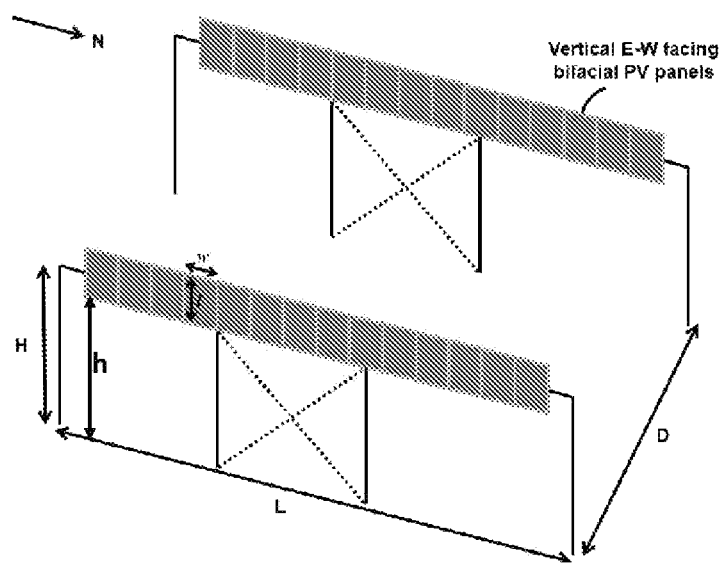
FIG. 7 graphically illustrates vertical installation of E-W facing bifacial PV panels to reduce height, H, of the poles.

Another embodiment is shown in FIG. 7 and consists of the installation of bifacial panels in fixed vertical position facing E-W (aligned with the longitudinal). The absence of a tracking system contributes towards reducing capital cost. The distance D between the two adjacent solar rows is dictated by the width of the farm machinery. The farm machinery with the maximum width should be able to pass through between the two adjacent solar rows and therefore distance D must be greater than that maximum width. The height H is chosen such that the bottom edge of the vertical panel, h, should be high enough to avoid shadow on the PV modules from the plants being grown and harvested. If height of the tallest corn plant is expected to be 8 ft, then h can be slightly greater than 8 ft. For much smaller plants such as soybean or wheat, the height H or h is chosen to maximize power output while keeping the cost of the structure low. In other words, a slight elevation from the ground will be beneficial for the interception of the solar rays from the sun as well as collection of the reflected light from the ground and the plants. The orientation of the solar rows may be slightly adjusted from the exact E-W facing of the solar modules to maximize the collection of solar photons based on the total annual power output. This is because the position of the sun in the sky changes with the seasons within a year. According to the novel technology, the plant rows will run parallel to solar rows, that is along the north-south axis.

As for the tacking system in the first embodiment, cross bracing between the two adjacent solar rows that interferes with the height of farm machinery should be avoided in the arrangement of FIG. 7.

Figure 8:
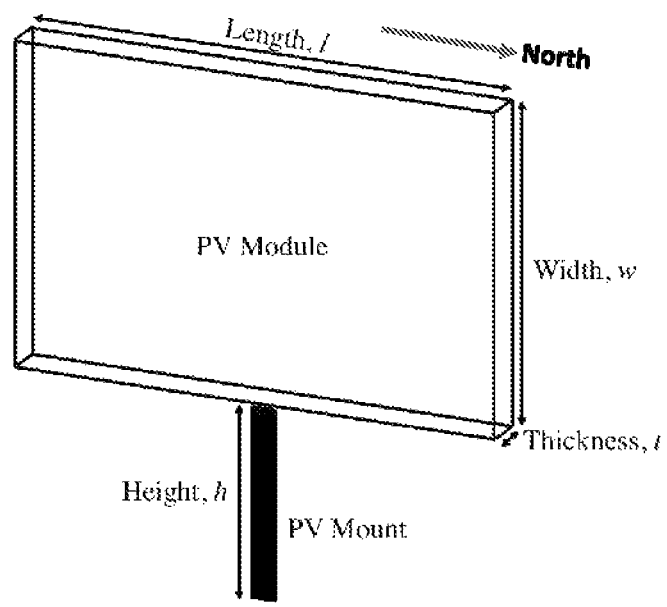
FIG. 8 graphically illustrates vertical installation of E-W facing bifacial PV panels on individual support poles.
Figure 9:
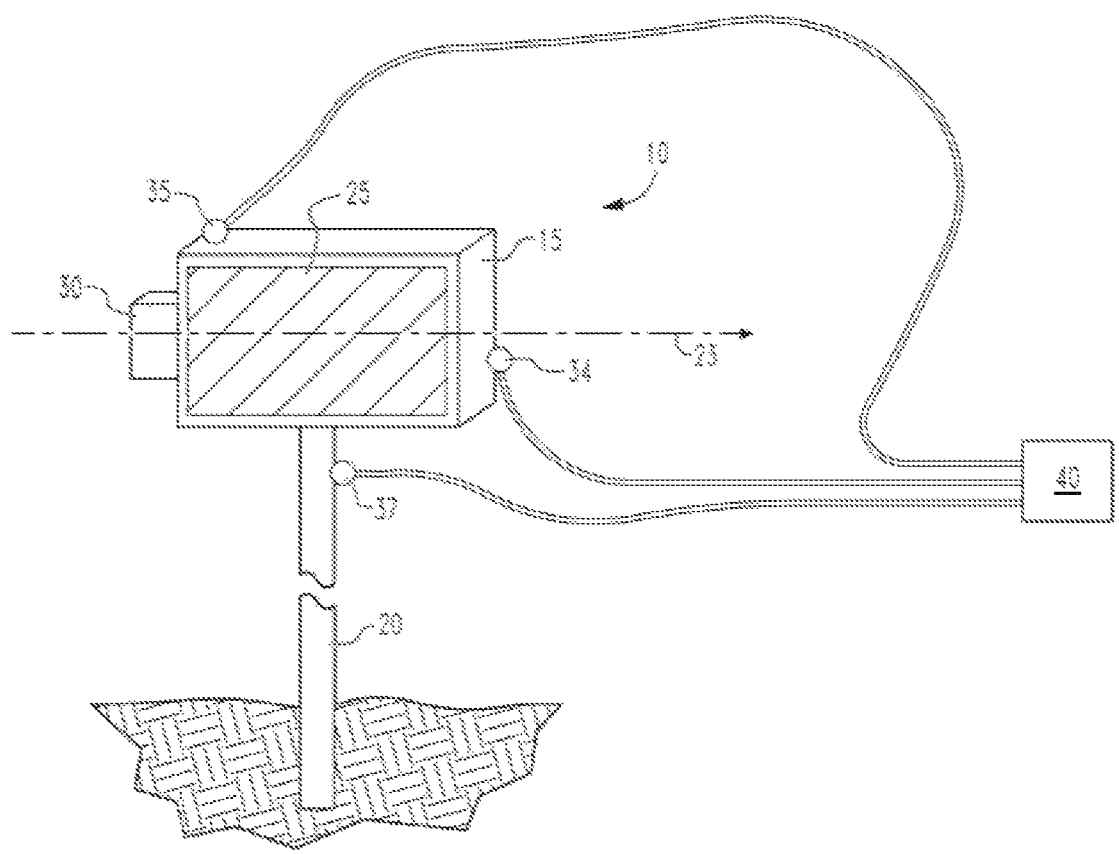
FIG. 9 schematically illustrates one embodiment of a modular PV system.
Figure 10A:
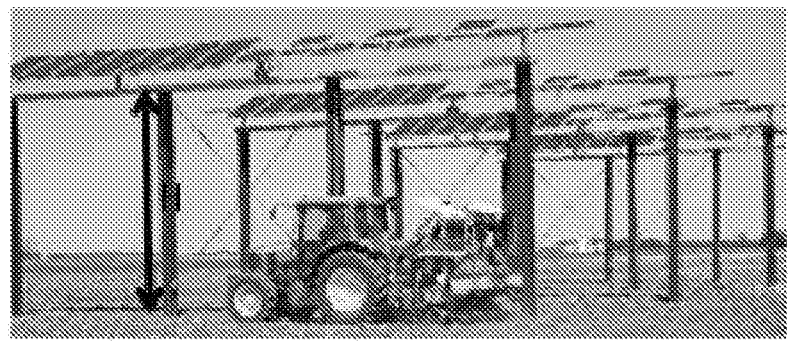
FIG. 10A-FIG. 10C are time-lapsed perspective views of a first embodiment aglectric solar array of the present novel technology, showing planting, growing, and harvesting times, respectively.
Figure 10B:
Figure 10C:
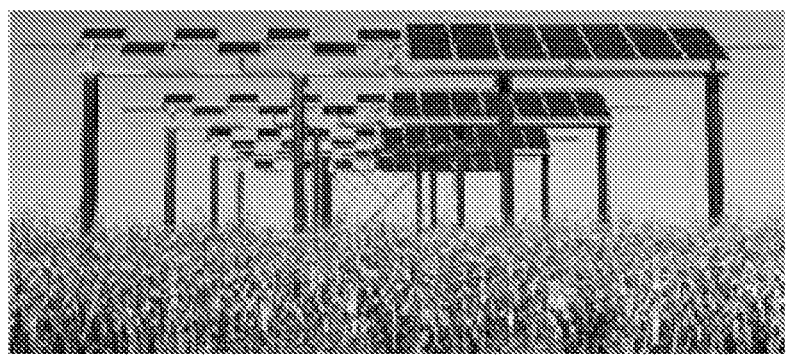
Figure 11:
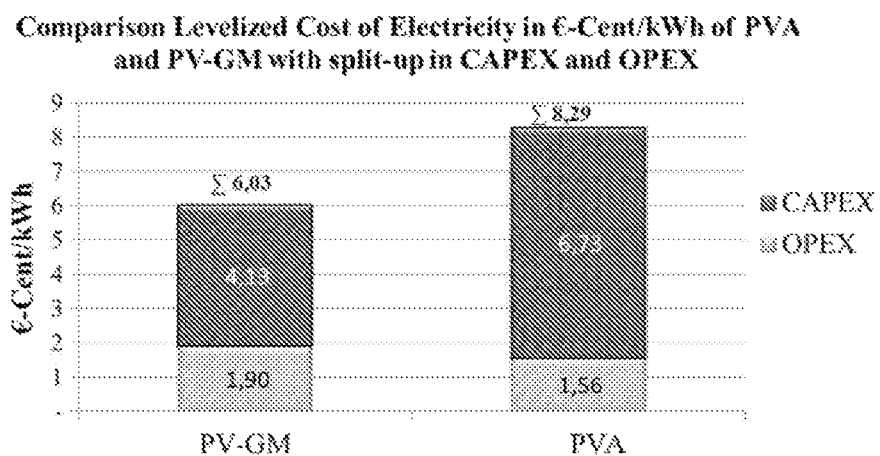
FIG. 11 graphically compares levelized cost of electricity of the conventional ground-mounted photovoltaic system with the prior art PVA system shown in FIGS. 1 and 2.

It is to be understood that there are several ways of installing E-W facing bifacial panels that do not interfere with the height of the farm machinery. An alternate method is shown in FIG. 8. Here a PV module or multiple modules are supported on an individual PV mount. The PV mount can be a pole or any suitable vertical arrangement supporting the PV modules. One face of the bifacial module faces east and the other west. Several of these units with their PV mount are installed next to each other to complete a solar row. In any given application, length of the solar row will be dictated by the available land and the needed power output. The distance between the two adjacent solar rows has to be greater than the maximum width of the farm machineries to be used. The advantage of mounting PV modules on single PV mount is that they could be rotated on a vertical axis to adjust orientation of the panels on as needed basis. Furthermore, if desired, the panels could be inclined with respect to the horizontal plane. By using these adjustments, during the time period when crop is not being grown, the orientation of the PV panels may be adjusted to maximize power generation.

The advantages of our bifacial panel arrangement are severalfold. First, as the sun's position in the sky changes throughout the day, the shadow also moves on the ground resulting in a dynamic shadow. The PV module face facing east casts shadow on the west side in the morning, the shadow is reduced near noon hours, and the face facing west casts shadow on the east side in the afternoon. At any location on the ground, the intensity of the light varies throughout the day. It means that unlike south facing fixed PV modules, we do not have static shadow. On average, this will provide more sunlight to the plants growing on the agriculture land. Also, an advantage of bifacial panel is that the sunlight is fully utilized throughout the day. The east face will collect sunlight in the forenoon hours and the west face will collect sunlight in the afternoon. The face not facing the sun will collect diffused as well as reflected light from the ground and the plants. This will ensure electricity production throughout the day. Additionally, during rain, especially during heavy rain, the rainwater impinging on the PV panels will fall directly under the PV modules. This means that any heavy rainwater falling from the edges of the solar panels will not directly impinge on any plants causing any potential damage. Furthermore, this water may be collected by building a conduit underneath the solar rows and used for other usage. The water could be collected in a pond and subsequently used for irrigation or purified and distributed for nonagricultural usages. The collected water could subsequently be used for cleaning the accumulated dust from the solar panels.

According to the prior art, the current height of the PV structures is constrained by the height of the tallest farm machinery used in agriculture practices. A combine harvester is such an example. This necessitates that these panels be installed at a height exceeding 20 ft. This increases the capital and construction cost of the PV module structures. This contributes to the increased LCOE of the power from such structures. The instant novel technology decouples the height of the solar arrays from the height of the tallest farm machinery while harnessing solar energy efficiently for power generation as well as ensuring that the shadow on the plants is a dynamic shadow thereby minimizing any detrimental impact from a static shadow. This means that the solar panels can be installed at a height required for efficient power generation at a much lower LCOE. This height will be much lower than the height of a combine-harvester used in a modern-day full-scale farm or any other tall farm machinery. This allows for successful plant operation using modern day farm machinery with any height for farm activities such as seeding, cultivation, harvesting etc. The reduction in the installed solar panel heights enables electricity generation at a much lower LCOE with minimal, if any, detrimental impact on crop yield and quality. In summary, the instant novel technology (1) makes full-scale PVA farming for major crops such as corn, soybean, wheat, rice etc. feasible; (2) enables the use of low height PV panels under actual full-scale farming conditions; (3) enables E-W tracking panels with dynamic shadow for major crop farming; (4) use of vertical bifacial panels with dynamic shadow for full-scale PVA farming; (5) During a rain period, they do not directly cover the plants from overhead. Additionally, the instant novel technology is also applicable to the agriculture land being used for grazing of farm animals. Here the height of the bottom edge of the solar modules in each of the two embodiments of the instant novel technology will have to be greater than the height of the tallest farm animal on the pasture land.

Example

An assembly 10 is provided for generating solar power in an agricultural setting, while minimizing interference with solar radiation with crop growth. The assembly includes a generally rectangular support scaffolding 15 and a plurality of support pylons 20, each pylon 20 operationally connected to the generally rectangular support scaffolding 15 and extending therefrom to ground. The support scaffolding defines a major axis 23. At least one, and more typically a plurality of, elongated bifacial solar panel(s) 25 is/are pivotably connected to the support scaffolding 15. At least one motor 30 is operationally connected to the plurality of elongated bifacial solar panels 25, wherein the motor 30 may be energized to pivot the plurality of elongated bifacial solar panels 25 about major axis 23. At least one sensor 35 is operationally connected to the support scaffolding 15 and/or solar panel(s) 25 for determining solar position. At least one sensor 37 is operationally connected to the support scaffolding 15 and/or solar panel(s) 25 for detecting approaching farm equipment. At least one sensor 39 is operationally connected to the support scaffolding 15 and/or solar panel(s) 25 for determining rainfall/weather. An electronic controller 40 is operationally connected to the at least one motor 30 and to the respective sensors 35, 37, 39. The respective elongated bifacial solar panels 25 are typically oriented in parallel, and each respective elongated bifacial solar panel 25 is separated from adjacent respective elongated bifacial solar panels 25 by a sufficient distance to allow passage of large farm equipment therebetween. The generally rectangular support scaffolding 15 and plurality of elongated bifacial solar panels 25 may be positioned sufficiently above ground level to allow passage of large farm equipment therebelow, but typically the spacing between scaffolds 15 is sufficient to allow passage of farm equipment therebetween.

In operation, the respective elongated bifacial solar panels 15 are oriented to pivot about the major axis, such that the solar panels face the east and west directions. The electronic controller 40 is programmed to pivot respective elongated bifacial solar panels 15 with permissible maximum angle from the horizontal $\theta_m$ such that the overhang of a respective elongated bifacial solar panel assemblies 10 does not impede the movement of the widest farm machinery therebelow. The electronic controller 40 is programmed to pivot respective elongated bifacial solar panels 15 with permissible maximum angle from the horizontal $\theta_m$ at night and/or during rainfall.

The electronic controller 40 is programmed to pivot respective elongated bifacial solar panels 25 with permissible maximum angle from the horizontal $\theta_m$ such that the overhang of a respective elongated bifacial solar panel modules at $\theta_m$ produces minimal overhead cover to plants therebelow. At least one sensor 37 for detecting large farm equipment may be mounted on the assembly and operationally connected to the electronic controller 40. Upon detection of large farm equipment, the electronic controller 40 energizes the at least one motor 30 to pivot respective elongated bifacial solar panels 25 away from the large farm equipment. Likewise, a weather sensor 39 or weather information feed may be operationally connected to the electronic controller 40, and the elongated bifacial solar panels 25 may thus be automatically pivoted to a generally vertical orientation during rain. Likewise, the elongated bifacial solar panels 25 may be automatically pivoted to a be oriented perpendicular to solar rays at predetermined times.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

We claim:

1. An assembly for generating solar power in an agricultural setting while minimizing interference with crop growth, comprising:
   a plurality of rectangular support scaffolding separated by a distance;
   a plurality of support pylons operationally connected to the rectangular support scaffolding and extending therefrom into ground;
   a plurality of elongated bifacial solar panels pivotably connected to the support scaffolding oriented to face an east-west direction;
   wherein the height of the plurality of elongated bifacial solar panels in the horizontal position are less than the height of large farm equipment;
   wherein the plurality of elongated bifacial solar panels has a predetermined large farm equipment specialized module rotation greater than 45 degrees from horizontal;
   wherein the distance D of the plurality of the rectangular support scaffolding is configured to allow large farm equipment to pass unimpeded over all rows of crops between the plurality of pylons when the elongated bifacial solar cells are rotated to the predetermined large farm equipment specialized module rotation;
   at least one motor operationally connected to the plurality of elongated bifacial solar panels, wherein the at least one motor when energized is configured to pivot the plurality of elongated bifacial solar panels;
   at least one sensor for determining solar position;
   at least one sensor for determining the presence of large farm equipment;
   a weather sensor for detecting rain;
   an electronic controller operationally connected to the at least one motor and to the at least one sensor for determining solar position, to the at least one sensor for determining the presence of large farm equipment, and to the weather senor for detecting rain;
   wherein the controller is configured to energize the motor when the sensor detects the presence of large farm equipment, the motor rotating the plurality of elongated bifacial solar panels to the predetermined large farm equipment specialized module rotation.

2. The assembly of claim 1 wherein the respective elongated bifacial solar panels are oriented to pivot in an east-west direction.

3. The assembly of claim 1 wherein upon detection of large farm equipment, the electronic controller energizes the at least one motor to pivot respective elongated bifacial solar panels away from the large farm equipment.

4. The assembly of claim 1 wherein the plurality of elongated bifacial solar panels are automatically pivoted to a generally vertical orientation during rain.

5. The assembly of claim 1 wherein the plurality of elongated bifacial solar panels are automatically pivoted to a be oriented perpendicular to solar rays at predetermined times.

6. The assembly of claim 5 wherein the plurality of elongated bifacial solar panels are automatically pivoted to face east.

7. The assembly of claim 5 wherein the plurality of elongated bifacial solar panels are automatically pivoted to face west.

8. The assembly of claim 1 wherein upon detection of large farm equipment, the electronic controller energizes the at least one motor to pivot respective elongated bifacial solar panels towards the large farm equipment.

\* \* \* \* \*